US012548582B2

(12) United States Patent
Tammi

(10) Patent No.: US 12,548,582 B2
(45) Date of Patent: Feb. 10, 2026

(54) APPARATUS, METHODS AND COMPUTER PROGRAMS FOR AUDIO FOCUSING

(71) Applicant: Nokia Technologies Oy, Espoo (FI)

(72) Inventor: Mikko Tapio Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 253 days.

(21) Appl. No.: 18/268,698

(22) PCT Filed: Nov. 30, 2021

(86) PCT No.: PCT/FI2021/050827
§ 371 (c)(1),
(2) Date: Jun. 21, 2023

(87) PCT Pub. No.: WO2022/136726
PCT Pub. Date: Jun. 30, 2022

(65) Prior Publication Data

US 2024/0062769 A1 Feb. 22, 2024

(30) Foreign Application Priority Data

Dec. 23, 2020 (GB) ...................................... 2020479

(51) Int. Cl.
*H04R 3/00* (2006.01)
*G10L 21/0264* (2013.01)
*H04R 1/40* (2006.01)
*G10L 21/0216* (2013.01)

(52) U.S. Cl.
CPC .......... *G10L 21/0264* (2013.01); *H04R 1/406* (2013.01); *H04R 3/005* (2013.01); *G10L 2021/02166* (2013.01)

(58) Field of Classification Search
CPC ..... H04R 3/005; H04R 1/406; G10L 21/0264; G10L 15/22; G10L 15/20; G10L 21/0232
USPC ............................................. 381/56, 92, 110
See application file for complete search history.

(56) References Cited

U.S. PATENT DOCUMENTS

| | | | | | |
|---|---|---|---|---|---|
| 9,552,840 | B2 * | 1/2017 | Kim | | H04R 3/005 |
| 10,510,362 | B2 * | 12/2019 | Hicks | | H04R 1/406 |
| 10,585,472 | B2 | 3/2020 | Tokubo et al. | | 3/13 |
| 10,598,543 | B1 * | 3/2020 | Mansour | | H04R 1/326 |
| 10,622,004 | B1 * | 4/2020 | Zhang | | G10L 25/78 |

(Continued)

OTHER PUBLICATIONS

Timofeev, S. et al., "Adaptive Acoustic Beamformer With Source Tracking Capabilities," IEEE Transactions on Signal Processing, vol. 56, No. 7, Jul. 2008, pp. 2812-2820.

(Continued)

*Primary Examiner* — Disler Paul
(74) *Attorney, Agent, or Firm* — McCarter & English LLP

(57) ABSTRACT

Examples of the disclosure relate to apparatus, methods and computer programs for audio focusing in mobile devices. In some examples the apparatus includes circuitry for providing a plurality of beams for processing microphone audio signals. The apparatus can also include circuitry for analysing the plurality of beams to determine one or more parameter values based on the microphone audio signals in a plurality of different frequency bands, and selecting at least one of the plurality of beams for use based on the determined one or more parameter values in the plurality of different frequency bands such that different beams can be selected for different frequency bands.

19 Claims, 5 Drawing Sheets

(56) References Cited

U.S. PATENT DOCUMENTS

Figure 1:
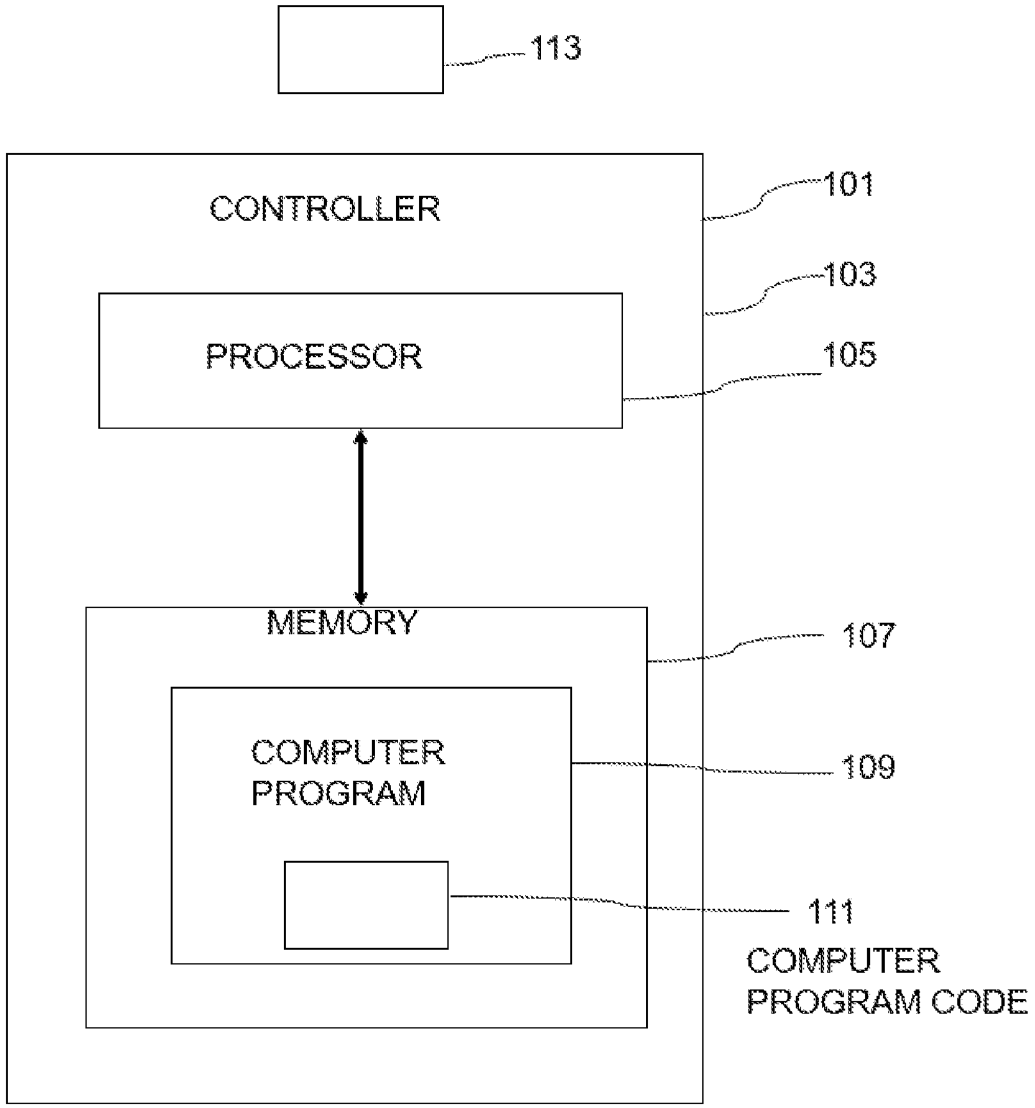

| | | | |
|---|---|---|---|
| 10,755,728 | B1 | 8/2020 | Ayrapetian et al. |
| 10,887,709 | B1 * | 1/2021 | Mansour ................ H04R 3/005 |
| 11,095,978 | B2 * | 8/2021 | Gigandet ............ G10L 21/0216 |
| 11,171,701 | B2 * | 11/2021 | Min ..................... H04B 7/0695 |
| 11,343,605 | B1 * | 5/2022 | Dusan .................. H04R 1/1041 |
| 2014/0105416 | A1 | 4/2014 | Huttunen et al. ............... 381/92 |
| 2018/0213326 | A1 | 7/2018 | Huttunen et al. ................... 5/27 |
| 2018/0242078 | A1 | 8/2018 | Katagiri |

OTHER PUBLICATIONS

Delikaris-Manias, S. "Parametric spatial audio processing utilizing compact microphone arrays," Aalto University, Doctoral Dissertations, Helsinki, Finland, Nov. 10, 2017.

* cited by examiner

APPARATUS, METHODS AND COMPUTER PROGRAMS FOR AUDIO FOCUSING

CROSS REFERENCE TO RELATED APPLICATION

This patent application is a U.S. National Stage application of International Patent Application Number PCT/FI2021/050827 filed Nov. 30, 2021, which is hereby incorporated by reference in its entirety, and claims priority to GB 2020479.8 filed Dec. 23, 2020.

TECHNOLOGICAL FIELD

Examples of the disclosure relate to apparatus, methods and computer programs for audio focusing. Some relate to apparatus, methods and computer programs for audio focusing in mobile devices.

BACKGROUND

Audio focusing enables directional amplification and attenuation of microphone audio signals. This is intended to enable the amplification of target sound sources while attenuating unwanted sound sources. This can be problematic if unwanted sound sources are positioned close to, or in a similar direction, to the target sound sources.

BRIEF SUMMARY

According to various, but not necessarily all, examples of the disclosure there may be provided an apparatus comprising means for: providing a plurality of beams for processing microphone audio signals; analysing the plurality of beams to determine one or more parameter values based on the microphone audio signals in a plurality of different frequency bands; and selecting at least one of the plurality of beams for use based on the determined one or more parameter values in the plurality of different frequency bands such that different beams can be selected for different frequency bands.

The one or more parameter values may give an indication of whether or not a target sound source is within a beam.

The one or more parameter values may give an indication of noise levels within a beam.

The one or more parameter values may comprise energy levels.

For frequency bands with a beam width above an upper angular threshold the beam having the lowest energy level may be selected.

For frequency bands with a beam width below a lower angular threshold the beam having the highest energy level may be selected.

For frequency bands with a beam width between the upper angular threshold and the lower angular threshold the beam closest to a target direction may be selected.

Different beams may be selected for different frequency bands.

The plurality of beams may be overlapping.

The plurality of beams may cover a focus direction of a camera coupled to the apparatus.

The plurality of beams may be determined by microphones used to capture the audio signals.

According to various, but not necessarily all, examples of the disclosure there is provided an apparatus comprising at least one processor; and at least one memory including computer program code, the at least one memory and the computer program code configured to, with the at least one processor, cause the apparatus at least to perform: providing a plurality of beams for processing microphone audio signals; analysing the plurality of beams to determine one or more parameter values based on the microphone audio signals in a plurality of different frequency bands; and selecting at least one of the plurality of beams for use based on the determined one or more parameter values in the plurality of different frequency bands such that different beams can be selected for different frequency bands.

According to various, but not necessarily all, examples of the disclosure there may be provided at least one of; a mobile device, a surveillance system comprising an apparatus as described herein.

According to various, but not necessarily all, examples of the disclosure there may be provided a method comprising: providing a plurality of beams for processing microphone audio signals; analysing the plurality of beams to determine one or more parameter values based on the microphone audio signals in a plurality of different frequency bands; and selecting at least one of the plurality of beams for use based on the determined one or more parameter values in the plurality of different frequency bands such that different beams can be selected for different frequency bands.

According to various, but not necessarily all, examples of the disclosure there may be provided a computer program comprising computer program instructions that, when executed by processing circuitry, cause: providing a plurality of beams for processing microphone audio signals; analysing the plurality of beams to determine one or more parameter values based on the microphone audio signals in a plurality of different frequency bands; and selecting at least one of the plurality of beams for use based on the determined one or more parameter values in the plurality of different frequency bands such that different beams can be selected for different frequency bands.

BRIEF DESCRIPTION

Figure 2:
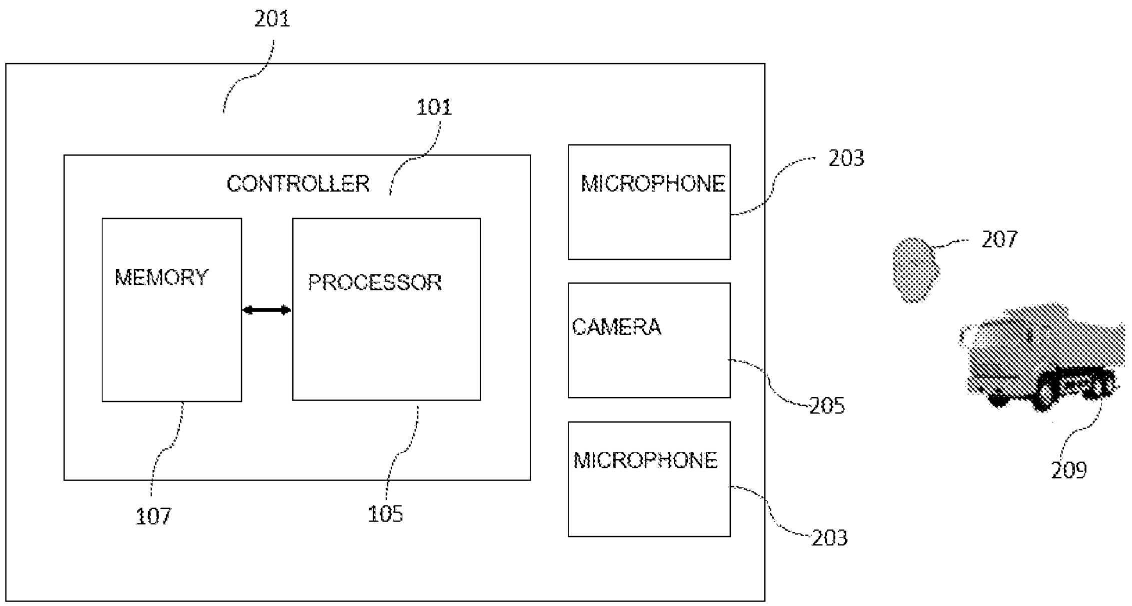
Figure 3:
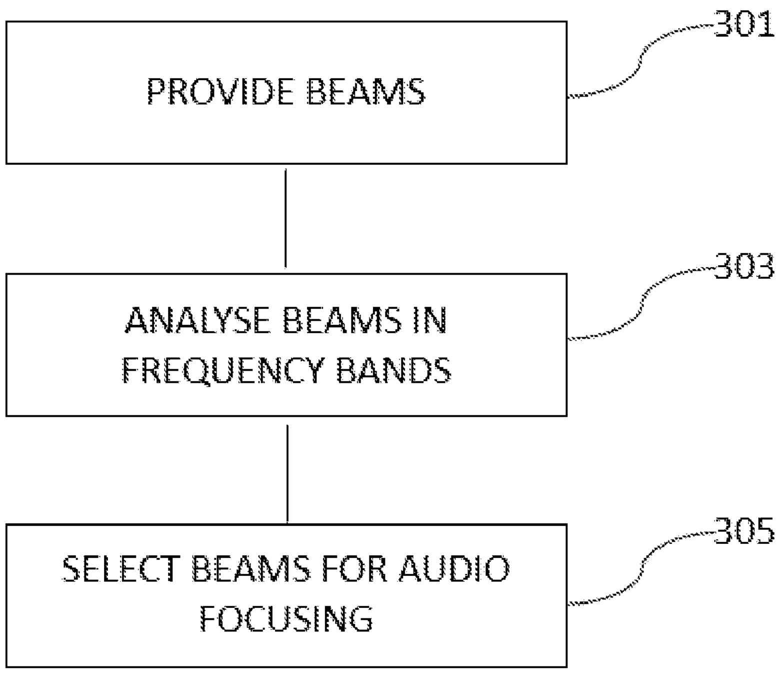
Figure 4:
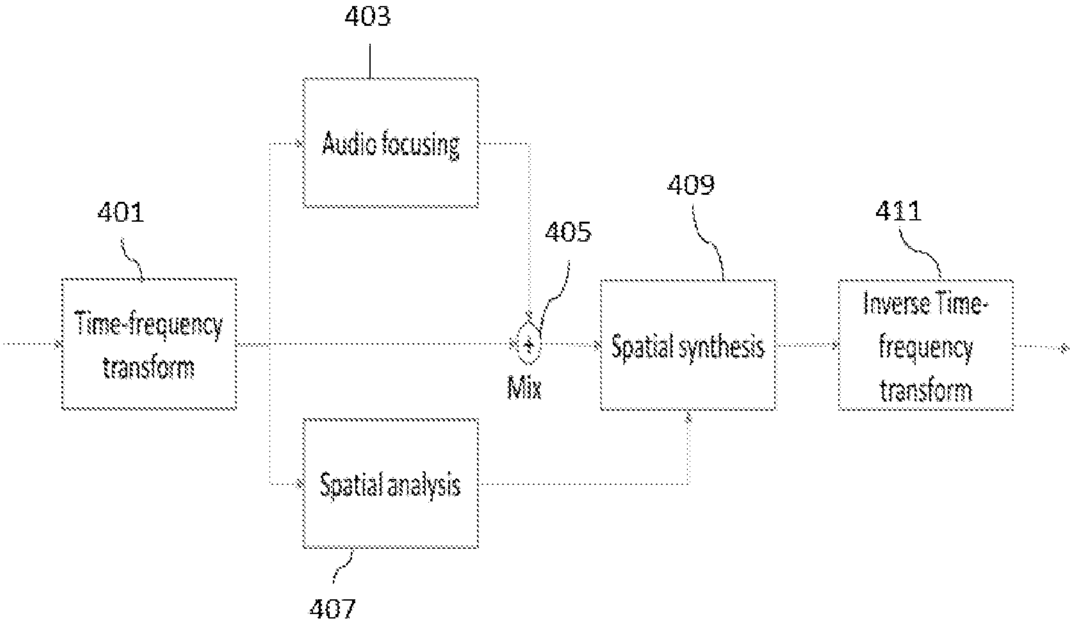
Figure 5:
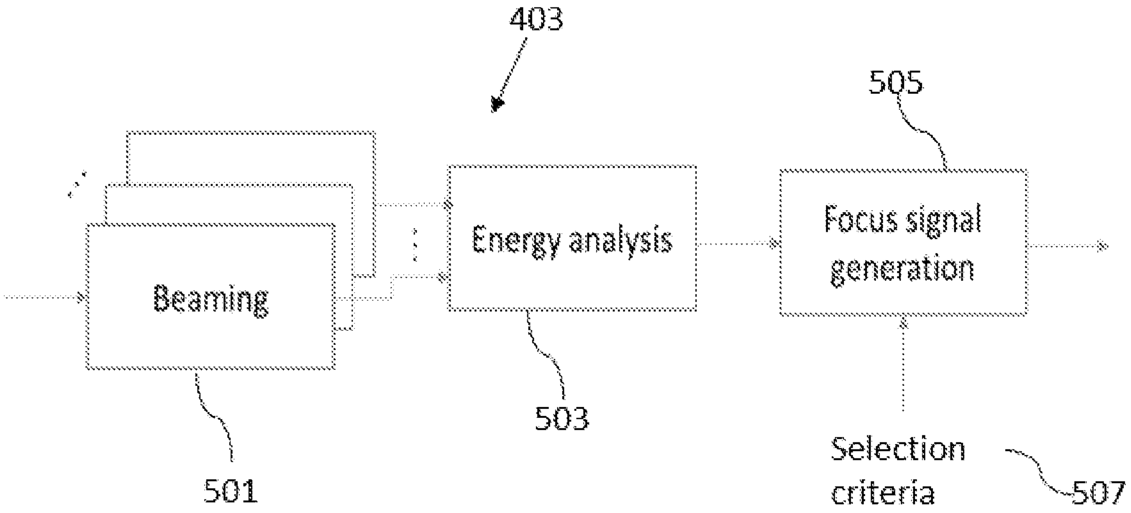
Figure 6A:
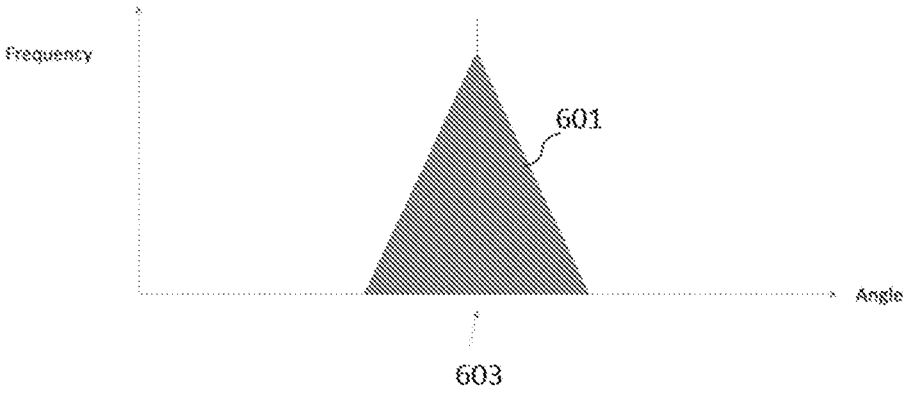
Figure 6B:
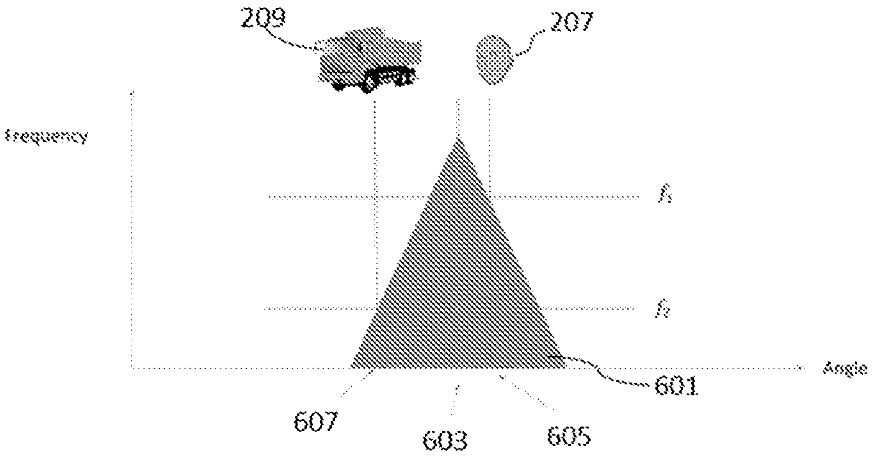
Figure 6C:
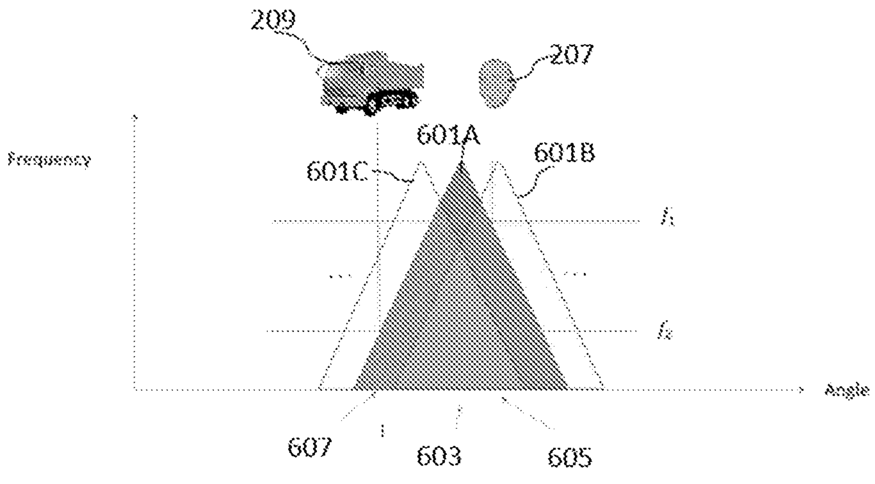
Figure 7:
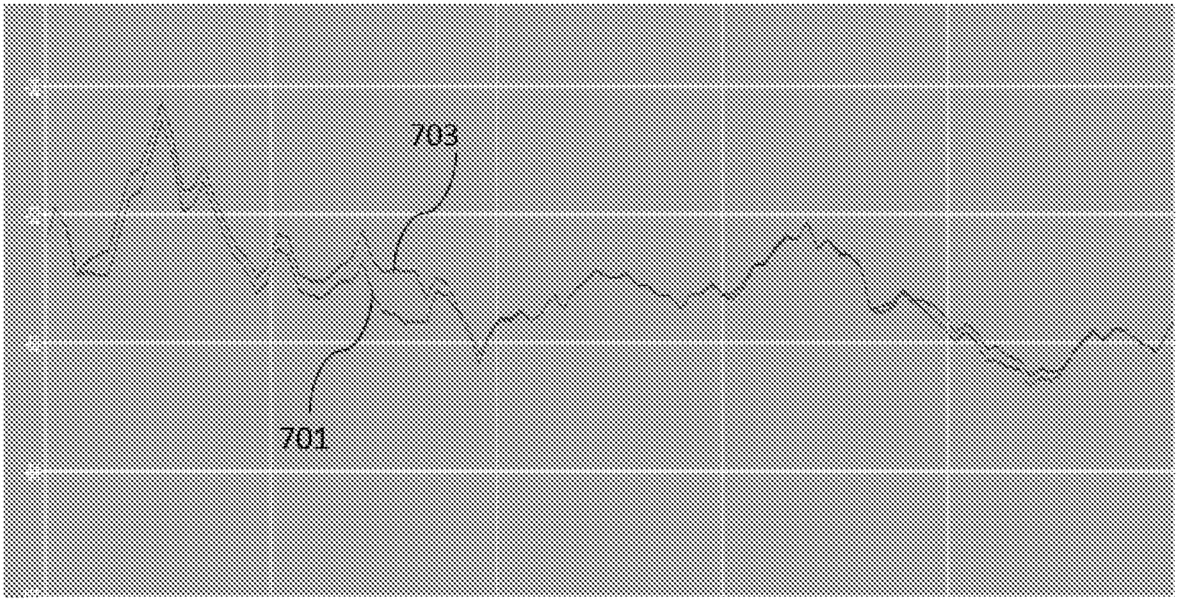

Some examples will now be described with reference to the accompanying drawings in which:

FIG. 1 shows an example apparatus;
FIG. 2 shows an example device;
FIG. 3 shows an example method;
FIG. 4 shows an example method;
FIG. 5 shows an example method;
FIGS. 6A to 6C show example beams; and
FIG. 7 shows example results.

DETAILED DESCRIPTION

Examples of the disclosure relate to apparatus for providing audio focusing around a main target direction. This can be used in devices where audio is being captured to accompany video images or in any other cases where the beams available for the audio focusing are restricted. In examples of the disclosure a plurality of candidate beams can be analysed for different frequency bands and beams that provide performances above a defined threshold can be selected for the different frequency bands. In some examples the beams can be selected to provide an optimal performance or a substantially optimal performance. This can be useful in examples where sources of unwanted noise are positioned close to, or in similar direction, to target sound sources.

FIG. 1 schematically illustrates an apparatus 101 that can be used to implement examples of the disclosure. The apparatus 101 illustrated in FIG. 1 can be a chip or a chip-set. In some examples the apparatus 101 can be provided within devices such as a processing device. In some examples the apparatus 101 can be provided within an audio capture device or an audio rendering device.

In the example of FIG. 1 the apparatus 101 comprises a controller 103. In the example of FIG. 1 the implementation of the controller 103 can be as controller circuitry. In some examples the controller 103 can be implemented in hardware alone, have certain aspects in software including firmware alone or can be a combination of hardware and software (including firmware).

As illustrated in FIG. 1 the controller 103 can be implemented using instructions that enable hardware functionality, for example, by using executable instructions of a computer program 109 in a general-purpose or special-purpose processor 105 that can be stored on a computer readable storage medium (disk, memory etc.) to be executed by such a processor 105.

The processor 105 is configured to read from and write to the memory 107. The processor 105 can also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIGS. 3 to 5. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: providing 301 a plurality of beams for processing microphone audio signals; analysing 303 the plurality of beams to determine one or more parameter values based on the microphone audio signals in a plurality of different frequency bands; and selecting 305 at least one of the plurality of beams based on the determined one or more parameter values in the plurality of different frequency bands such that different beams can be selected for different frequency bands.

As illustrated in FIG. 1 the computer program 109 can arrive at the apparatus 101 via any suitable delivery mechanism 113. The delivery mechanism 113 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism can be a signal configured to reliably transfer the computer program 109. The apparatus 101 can propagate or transmit the computer program 109 as a computer data signal. In some examples the computer program 109 can be transmitted to the apparatus 101 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: providing 301 a plurality of beams for processing microphone audio signals; analysing 303 the plurality of beams to determine one or more parameter values in the microphone audio signals in a plurality of different frequency bands; and selecting 305 at least one of the plurality of beams for use for processing microphone audio signals in the different frequency bands based on the determined one or more parameter values.

The computer program instructions can be comprised in a computer program 109, a non-transitory computer readable medium, a computer program product, a machine readable medium. In some but not necessarily all examples, the computer program instructions can be distributed over more than one computer program 109.

Although the memory 107 is illustrated as a single component/circuitry it can be implemented as one or more separate components/circuitry some or all of which can be integrated/removable and/or can provide permanent/semi-permanent/dynamic/cached storage.

Although the processor 105 is illustrated as a single component/circuitry it can be implemented as one or more separate components/circuitry some or all of which can be integrated/removable. The processor 105 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

FIG. 2 shows an example device 201 comprising an apparatus 101 as shown in FIG. 1. The apparatus 101 could comprise a mobile device such as a mobile phone or other similar device. In some examples the device 201 could be a surveillance system or any other suitable type of device.

The device 201 comprises an apparatus 101 as shown in FIG. 1. The apparatus 101 can be configured for audio focusing of captured audio signals such as microphone audio signals. The apparatus 101 can be configured to perform methods such as the methods shown in FIGS. 3 to 5.

The device 201 also comprises two or more microphones 203. The microphones 203 can comprise any means that can be configured to capture sound and enable a microphone audio signal to be provided. The microphone audio signals comprise an electrical signal that represents at least some of the sound field captured by the microphones 203.

In the example shown in FIG. 2 the device 201 comprises two microphones 203. A first microphone 203 is provided at a first side of the device 201 and a second microphone 203 is provided at the other side of the device 201. It is to be appreciated that other numbers and configurations of the microphones 203 can be provided in other examples of the disclosure. Having a larger number of microphones can improve the performance of the audio focusing. The microphones 203 could be fixed in position within the electronic device 201 so that the microphones 203 cannot move relative to the camera 205. In other examples the microphones 203 can be configured to move relative to the camera 205. In such examples any movement is known so that the relative positions of the camera 205 and the microphones 203 is known.

The microphones 203 are coupled to the apparatus 101 so that the microphone audio signals are provided to the apparatus 101 for processing. The processing performed by the apparatus 101 can comprise audio focusing of the microphone audio signals. The audio focusing can amplify target sound sources and attenuate unwanted sound sources. The audio focusing could comprise methods as shown in any of FIGS. 3 to 5.

The camera 205 can comprise any means that can enable images to be captured. The images could comprise video images, still images or any other suitable type of images. The images that are captured by the camera module can accompany the microphone audio signals from the two or more microphones 203.

In the example shown in FIG. 2 the device 201 is being used to capture audio signals to accompany images captured by the camera 205. The microphone audio signals can represent a sound field corresponding to the field of view of the camera. In the example of FIG. 2 the sound field comprises a target sound source 207 and an unwanted sound source 209. The target sound source 207 could be a person talking or any other suitable sound source. The target sound source 207 could be generated by an object that is within the field of view of the camera. The target sound source 207 could be the subject of images captured by the camera 205. The unwanted sound source 209 could comprise any unwanted noise. This could comprise background or ambient noise within the sound field or could comprise noise from sources that makes the target sound source 207 more difficult to hear. In this example the unwanted sound source 209 comprises a vehicle. Other types of unwanted sound source 209 could be present in other examples of the disclosure.

In the example of FIG. 2 the unwanted sound source 209 is positioned close to the target sound source 207. This means that it is difficult to audio focus the microphone audio signals to attenuate the unwanted sound source 209 without also attenuating the target sound source 207. This can also mean that it is difficult to audio focus the microphone audio signals to amplify the target sound source 207 without also amplifying the unwanted sound source 209. FIG. 3 shows an example method that can be used for audio focusing that can help to address such issue. This method can be used in devices 201 such as mobile devices shown in FIG. 2. This can be used in devices where the microphones 203 are in fixed positions or have a limited range of positions so that the beams that can be used for the audio focusing are limited to a predetermined set of beams.

FIG. 3 shows an example method that can be implemented using apparatus 101 and devices 201 as shown above.

At block 301 the method comprises providing a plurality of beams for processing microphone audio signals. The microphone audio signals can be captured by the two or more microphones 203 and provided to the apparatus 101 for processing.

The beams that are provided can comprise a predetermined set of available beams. The number of beams that are available can be limited by practical requirements such as the memory space available to store the beams.

The plurality of beams that are provided can be determined by the microphones 203 that are used to capture the audio signals. The beams that are provided can be determined by the positions of the microphones 203 and/or the type of microphones that have been used and/or the shape of the device 201 in which the microphones are positioned and/or any other suitable factor.

In other examples the beams that are provided can be determined by playing sounds at different known directions around the device 201 and then capturing these sounds using the microphones 203. The beam coefficients can then be computed from the microphone audio signals. Other methods could be used in other examples of the disclosure.

In some examples the beams that are available can be determined by the focus direction of the camera 205. In such examples the beams that are available can comprise beams that cover the focus direction of the camera 205.

In some examples of the disclosure the plurality of beams can be overlapping. The overlapping beams can all cover at least the focus direction of the camera 205.

At block 303 the method comprises analysing the plurality of beams to determine one or more parameter values based one the microphone audio signals in a plurality of different frequency bands. The analysis can use the microphone audio signals. In some examples some processing can be performed on the microphone audio signals before the analysis is performed. For example, pre-processing such as high pass filtering or equalization, could be performed on the microphone audio signals before the analysis is performed.

The one or more parameter values that are analysed can comprise any parameters that give an indication of whether or not a target sound source 207 is within a beam. In some examples the one or more parameter values can comprise any parameters that give an indication of noise levels within a beam. The noise levels can comprise any unwanted sounds such as background or ambient noise.

In some examples the one or more parameter values can comprise energy levels.

The plurality of beams are analysed for different frequency bands. This can enable the different shapes of the beams for different frequencies to be taken into account. For example, beam shapes tend to have narrower widths for higher frequencies than for lower frequencies. This can also take into account that different frequency bands can be expected to contain different amounts of unwanted noise and noise from the target sound source.

The analysis of the beams for the different frequency bands can determine whether or not the parameter values are within a threshold range. For example, the analysis can determine if the parameter value is above a threshold range or below a threshold range or between an upper threshold and a lower threshold. The selection of a beam can then be made based on whether or not the parameter values are within a threshold range for a given frequency band. In some examples the analysis of the beams for the different frequency bands can determine the optimal beam, or the substantially optimal beam, for each of the different frequency bands.

At block 305 the method comprises selecting at least one beam for use based on the determined one or more parameter values in the plurality of different bands.

In examples of the disclosure different beams can be selected for different frequency bands. This means that rather than selecting a single beam a plurality of different beams can be used for different frequency bands so that a first beam is used for a first frequency band while a second different beam is used for a second frequency band.

As an example, if two beams B1 and B2 are available, each beam can have a plurality of different frequency bands F1, F2 and F3. Each of the frequency bands can be analysed for each of the beams so that the analysis is performed for B1F1 (first band of B1), B1F2 (second band of B1), B1F3 (third band of B1) and for B2F1 (first band of B2), B2F2 (second band of B2), B2F3 (third band of B2). The final beam, which can be used for generating an audio focused output signal, can be selected as a combination of B1 and B2. For example, it could be B2F1-B1F2-B2F3. In this example we have limited the number of beams to two and the number of frequency bands to three for illustrative purposes. It is to be appreciated that any number of beams and frequency bands could be used in examples of the disclosure.

In some examples of the disclosure different selection criteria can be used for different frequency bands. For example, different threshold ranges can be used for different frequency bands. In some examples the criteria for a first frequency band could be whether or not the parameter value is above a threshold range, while the criteria for a second frequency band could be whether or not the parameter value is below a threshold range.

FIG. 4 schematically shows an example method that shows how the audio signals can be captured and processed. The capturing and processing of the audio signals can be performed by a device 201 such as the device 201 shown in FIG. 2. The method shown in FIG. 4 could be performed by an apparatus 101 such as the apparatus 101 shown in FIGS. 1 and 2.

At block 401 the method comprises performing a time-frequency transformation of a microphone audio signal. The time domain microphone audio signal can be divided into time domain frames using overlapping windows. The signal can be transformed into a frequency domain using any suitable filter bank.

At block 403 the method comprises audio focusing. The audio focusing can comprise selecting a beam for use in processing the microphone audio signal. FIG. 5 shows an example audio focusing process that can be used in examples of the disclosure. In examples of the disclosure different beams can be selected for different frequency bands. The audio focusing provides a focused signal as an output.

At block 405 the focused signals are mixed with the frequency domain microphone audio signals. This provides a mixed signal comprising two components where the two components are the microphone audio signals and the focused audio signals. The mixing ratio can be adjusted to control the strength of the focus effect.

At block 407 spatial analysis is performed on the frequency domain signal. the spatial analysis can comprise analysing spatial properties of the microphone audio signal. Any suitable process can be used to perform the spatial analysis. The spatial analysis can enable spatial features of the microphone audio signal to be identified. The spatial features could comprise information relating to the directions of sound sources from the microphone 203, the amount of ambience noise or any other suitable information.

At block 409 the method comprises spatial synthesis of the mixed signal that was generated at block 405. The spatial synthesis uses the information relating to the spatial features of the microphone audio signal to process the mixed signal. This adds spatial characteristics to the mixed signal.

At block 411 the method comprises performing an inverse time-frequency transformation of the spatial audio signal. The inverse time-frequency transformation can reverse the process of block 401 and convert the spatial signal back into the time domain. Any suitable filter bank can be used to convert the spatial signal back into the time domain.

The output of the method is therefore a focused spatial audio signal. The spatial audio signal could comprise a binaural signal or multichannel loudspeaker signal or any other suitable type of signal that enables a user to perceive spatial properties of the sound. In the example of FIG. 4 a spatial output signal is provided. It is to be appreciated that implementations of the disclosure could also be provided in systems that do not involve spatial audio processing.

FIG. 5 schematically shows an example audio focusing method that can be used in examples of the disclosure. This method could be performed at block 403 in the method shown in FIG. 4.

At block 501 a plurality of beams are provided. The beams that are provided can be determined by the positions of the microphones 203, the positions of the microphones 203 relative to the camera or any other suitable factor. In other examples the beams that are provided can be determined by using the microphones 203 to capture sound originating from known directions.

In the example shown in FIG. 5 the set of beams that are provided comprises three different beams. It is to be appreciated that any number of beams could be used in examples of the disclosure.

At block 503 the method comprises analysing the plurality of beams to determine one or more parameter values. In the example of FIG. 5 the analysis comprises energy analysis. Other parameter values could be analysed in other examples of the disclosure.

The analysis of the energy levels can be performed in frequency bands. For each of the available beams the energy levels in each of the frequency bands can be identified. This can enable the performance of different beams to be compared for different frequency bands.

At block 505 the audio focused signal is generated. The audio focused signal can be generated by selecting a beam for each of the different frequency bands. Different beams can be used for different frequency bands. The beam that is selected for use in a first frequency band can be independent of the selection of a beam for a second frequency band. The audio focused signal therefore uses a plurality of different beams for the different frequency bands.

In some examples, selection criteria 507 can be used to enable the audio focusing of the audio signals. The selection criteria 507 can be predetermined. The selection criteria 507 can be stored in a memory 107 of the apparatus 101 and can be retrieved when needed. The selection criteria 507 comprise any information that indicate the criteria that are to be used for selecting a beam. The selection criteria 507 can be different for different frequency bands.

FIGS. 6A to 6C schematically show example beams 601 that can be used in examples of the disclosure.

FIG. 6A shows a simplified example of a beam. In this example the beam 601 has a triangular shape centered around a focus direction 603. The beam 601 is wider for low frequencies than for high frequencies. In some examples the shape of the beams 601 can be defined as the frequency dependent angle where the sound objects outside the angle are attenuated 6 dB more than sound objects inside the angle.

In this example the beam 601 is symmetrical about the focus direction 603 so that the beam is equally distributed on either side of the focus direction. It is to be appreciated that in implementations of the disclosure more complex beam shapes could be used. For example, the beams could comprise a plurality of lobes or any other shapes. The shapes of the beams that are used can be determined by the beamforming processes that are used.

FIG. 6B shows a situation in which a target sound source 207 is positioned close to an unwanted sound source 209. In this example both the target sound source 207 and the unwanted sound source 209 are positioned close to, but misaligned with, the focus direction 603. In this example the target sound source 207 direction 605 is to the right of the focus direction 603 and the unwanted sound source 209 direction 607 is to the left of the focus direction 603.

In FIG. 6B three frequency bands are shown. The first frequency band is above $f_1$ the second frequency band is between $f_1$ and $f_2$, and the third frequency band is below $f_2$. These frequency bands are shown to illustrate the problems that arise when the target sound source 207 is positioned close to an unwanted sound source 209. It is to be appreciated that other frequency bands could be used in examples of the disclosure. FIG. 6B shows problems that can be addressed in examples of the disclosure. As shown in FIG. 6B, in the first frequency band the target sound source 207 is outside of the beam 601. This causes the target sound source 207 to be attenuated instead of amplified for these frequencies. This would degrade the understandability of the speaker and make their voice sound less bright.

In the third frequency band, below the second frequency $f_2$, the unwanted sound source 209 is inside of the beam 601. This causes the unwanted sound source 209 to be included within the focused signal. The presence of the unwanted sound source 209 would therefore degrade the target sound source 207. For example, it could make speech from the target sound source 207 harder to hear and understand.

FIG. 6C schematically shows how this problem can be addressed by using multiple beams. In the example shown in FIG. 6C three different beams 601A, 601B, 601C are provided. The first beam 601A is the beam focused on the target direction 603. The second beam 601B is focused to the right of the target direction. The third beam 601C is focused to the left of the target direction. The plurality of beams 601A, 601B, 601C are all overlapping. The plurality of beams 601A, 601B, 601C all comprise the focus direction for at least some of the frequencies.

It can be seen from FIG. 6C that the beams provide different performance levels in the different frequency bands.

In the first frequency band, above $f_1$, the second beam 601B provides a better performance level than the other beams 601A, 601C. The second beam, at least partially, comprises the target sound source 207 but does not comprise the unwanted sound source 209. In this particular example the second beam 601B is the only beam that comprises some of the target sound source 207. Therefore, the second beam 601B could be chosen for use in the first frequency band.

In the second frequency band, below $f_1$ and above $f_2$, the first beam 601A and the second beam 601B provide similar performance levels as they both include the target sound source 207 and do not include the unwanted sound source 209. In this example either the first beam 601A or the second beam 601B could be chosen for use in the second frequency band.

In the third frequency band, below $f_2$, the second beam 601B has a better performance level than the other beams 601A, 601C. The second beam comprises the target sound source 207 but does not comprise the unwanted sound source 209. In this particular example the second beam 601B is the only beam that comprises some of the target sound source 207. In this frequency band both the first beam 601A and the third beam 601C include the unwanted sound source 209. Therefore, the second beam 601B could be chosen for use in the third frequency band.

It is to be appreciated that in examples of the disclosure the actual directions of the target sound source 207 and unwanted sound sources 209 might not be known. In such examples estimates of the energy levels inside the beams for the different frequency bands can provide an indication of whether or not the target sound source 207 and/or unwanted sound sources 209 are within the beam. In such examples the properties of the beam such as the beam width can be determined before the analysis of the energy levels is performed.

In such examples the audio focusing can be performed by selecting a plurality of beams. The plurality of beams can all be located near the target focus direction 603. The plurality of beams can all be selected so that they cover the target focus direction 603 for at least some of the frequency bands. The plurality of beams can be overlapping as shown schematically in FIG. 6C.

The spatial properties of the plurality of beams can be determined. The spatial properties can comprise information indicative of the width of the plurality of beams in the different frequency bands and/or any other suitable information.

Once the plurality of beams have been selected the microphone audio signals can be divided in n frames. The dividing of the microphone audio signals into n frames can be performed in the time domain.

After the microphone audio signals have been divided in the n frames then a time-frequency transformation can be performed to transform the signals into the frequency domain. In the frequency domain the signal is divided into sub-bands j where J is the total number of sub-bands.

A beam is formed for every time domain frame n with each of the plurality of beams $B_1, B_2, \ldots B_R$, where R is the total number of beams. This provides a plurality of beamed signals $S_{B_r}(n,k)$, where k is the frequency bin index.

The total energy of each beamed signal $E_{B_r}(n,j)$ can be computed for each time-frequency slot. This determined energy level can then be used to select a beam to be used for a given frequency band.

For frequency bands which have higher beam widths it can be assumed that the target sound source 207 is in each of the beams. In this case the beams with the lowest energy can be assumed to provide better quality as they would comprise less of the unwanted sound source 209. Therefore, for frequency bands with a beam width above an upper angular threshold the beam having the lowest energy level is selected.

For frequency bands which have lower beam widths it can be assumed that the target sound source 207 is only in some of the beams. Therefore, the beams with the highest energy levels can be assumed to best contain the target sound source 207. Therefore, for frequency bands with a beam width below a lower angular threshold the beam having the highest energy level is selected.

For frequency bands with a beam width between the upper angular threshold and the lower angular threshold the beam can be selected based on properties of the beam such as the shape or angular resolution. For example, for frequency bands with a beam width between the upper angular threshold and the lower angular threshold the beam closest to a target direction is selected.

So in this example;

a. for every frequency band j where the average beam width is above $\alpha_{high}$ the beamed signal with least energy is selected,
b. for every frequency band j where the average beam width is between $\alpha_{high}$ and $\alpha_{low}$ the beam which is nearest to the focus target direction is selected.
c. for every frequency band j where the average beam width is below $\alpha_{low}$ the beamed signal with highest energy is selected.

Once the beams have been selected the audio signals can be transformed back to the time domain.

It is to be appreciated that in implementations of the disclosure the target sound source 207 and the unwanted sound source 209 might not be active all of the time. For example, in human speech there are silent pauses between words. These temporal variations can be accounted for in the methods described herein. In such cases the beams that are selected for use can vary for different time frames. In such examples a first beam could be selected for use in a first frequency band for a first time frame and a second different beam could be selected for use for the same first frequency band in a second different time frame.

FIG. 7 shows example results that can be obtained using examples of the disclosure. FIG. 7 shows an example audio signal spectrum 703 obtained without using the examples of the disclosure. This audio signal spectrum 703 could be obtained by just focusing to the target direction. FIG. 7 also shows an example audio signal spectrum 701 obtained using examples of the disclosure.

In this example the target sound sources 207 comprised two people speaking simultaneously outdoors. A first person was provided in a front right position and second person was provided in a front left position. The focus direction 603 was targeted towards the person in the front left position.

In the audio signal spectrum 701 obtained using examples of the disclosure there is less energy at low frequencies because the unwanted sounds sources can be attenuated more effectively. In this case the level difference appears to be around 3-dB.

At higher frequencies, where the beam widths would be narrow the examples of the disclosure select the beams with highest energy to capture the target sound source 207. As shown in FIG. 7 audio signal spectrum 701 obtained using examples of the disclosure has a higher energy for these higher frequencies. In this example the increase in energy can be up to 2 dB. This therefore provides an improved audio output for a user.

In the above examples it has been assumed that the focusing is only done for the horizontal level. In other examples of the disclosure the focusing can also be used in a vertical direction. In such cases the energy levels can be analysed for different azimuth and elevation combinations. The shape of the beam is typically not symmetrical to azimuth and elevation directions. Therefore the values of the threshold angles $\alpha_{high}$ and $\alpha_{low}$ can be defined separately for horizontal and vertical directions. The example methods described above can then be used to analyse the various energy levels and select an appropriate beam.

In the above examples the average width of the beam inside the frequency band was used as the main parameter to define the principle how the beam to be used is selected. In other examples frequency can be used as the parameter. In such examples, at low frequencies the target would be to minimize, or substantially minimize, energy and at high frequencies the target would be to maximize, or substantially maximize, energy.

In the above description frequency band energy level is used as a measure for selecting the beam to be used. It should be understood that also many other measures or analysis techniques can be used for selecting the beams to be used. Examples of such methods are for example highest absolute value and average absolute value. The method can also be more advanced signal analysis solution such as background noise level estimate. The above described methods can be adapted for use with these alternative parameter values.

In this description the term coupled means operationally coupled. Any number or combination of intervening elements can exist between coupled components including no intervening elements.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus, comprising:

at least one processor; and at least one memory storing instructions that, when executed with the at least one processor, cause the apparatus at least to:

provide a plurality of beams for processing microphone audio signals;

analyse the plurality of beams to determine one or more parameter values based on the microphone audio signals in a plurality of different frequency bands; and select at least one of the plurality of beams for use based on the determined one or more parameter values in the plurality of different frequency bands wherein one or more different beams are selected for one or more different frequency bands, and wherein for frequency bands with a beam width between an upper angular threshold and a lower angular threshold, the instructions, when executed with the at least one processor, select the beam closest to a target direction.

2. An apparatus as claimed in claim 1, wherein the one or more parameter values give an indication of whether or not a target sound source is within a beam.

3. An apparatus as claimed in claim 1, wherein the one or more parameter values give an indication of noise levels within a beam.

4. An apparatus as claimed in claim 1, wherein the one or more parameter values comprise energy levels.

5. An apparatus as claimed in claim 1, wherein the instructions, when executed with the at least one processor, select different beams for different frequency bands.

6. An apparatus as claimed in claim 1, wherein the plurality of beams are overlapping.

7. An apparatus as claimed in claim 1, wherein the plurality of beams cover a focus direction of a camera coupled to the apparatus.

8. An apparatus as claimed in claim 1, wherein the plurality of beams is determined with microphones used to capture the audio signals.

9. An apparatus as claimed in claim 1, wherein the apparatus is at least one of: a mobile device; or a surveillance system.

10. An apparatus comprising:

at least one processor; and at least one memory storing instructions that, when executed with the at least one processor, cause the apparatus at least to:

provide a plurality of beams for processing microphone audio signals;

analyse the plurality of beams to determine one or more parameter values based on the microphone audio signals in a plurality of different frequency bands; and select at least one of the plurality of beams for use based on the determined one or more parameter values in the plurality of different frequency bands wherein one or more different beams are selected for one or more different frequency bands, and wherein for frequency bands with a beam width above an upper angular threshold, the instructions, when executed with the at least one processor, select the beam having the lowest energy level.

11. An apparatus comprising:

at least one processor; and at least one memory storing instructions that, when executed with the at least one processor, cause the apparatus at least to:

provide a plurality of beams for processing microphone audio signals;

analyse the plurality of beams to determine one or more parameter values based on the microphone audio signals in a plurality of different frequency bands; and select at least one of the plurality of beams for use based on the determined one or more parameter values in the plurality of different frequency bands wherein one or more different beams are selected for one or more different frequency bands, and wherein for frequency bands with a beam width below a lower angular threshold, the instructions, when executed with the at least one processor, select the beam having the highest energy level.

12. A method comprising:

providing a plurality of beams for processing microphone audio signals;

analysing the plurality of beams to determine one or more parameter values based on the microphone audio signals in a plurality of different frequency bands;

selecting at least one of the plurality of beams for use based on the determined one or more parameter values in the plurality of different frequency bands such that different beams are selected for different frequency bands; and selecting a beam closest to a target direction for frequency bands with a beam width between an upper angular threshold and a lower angular threshold.

13. A method as claimed in claim 12, wherein the one or more parameter values give an indication of whether or not a target sound source is within a beam.

14. A method as claimed in claim 12, wherein the one or more parameter values give an indication of noise levels within a beam.

15. A method as claimed in claim 12, wherein the one or more parameter values comprise energy levels.

16. A non-transitory program storage device readable with an apparatus, tangibly embodying a program of instructions executable with the apparatus for performing operations, the operations comprising:

providing a plurality of beams for processing microphone audio signals;

analysing the plurality of beams to determine one or more parameter values based on the microphone audio signals in a plurality of different frequency bands;

selecting at least one of the plurality of beams for use based on the determined one or more parameter values in the plurality of different frequency bands such that different beams are selected for different frequency bands; and selecting a beam closest to a target direction for frequency bands with a beam width between an upper angular threshold and a lower angular threshold.

17. A non-transitory program storage device as claimed in claim 16, wherein the one or more parameter values give an indication of whether or not a target sound source is within a beam.

18. A non-transitory program storage device as claimed in claim 16, wherein the one or more parameter values give an indication of noise levels within a beam.

19. A non-transitory program storage device as claimed in claim 16, wherein the one or more parameter values comprise energy levels.

* * * * *